April 9, 1963   N. D. LAWLESS   3,084,556
BALANCING APPARATUS
Filed Dec. 6, 1957   5 Sheets-Sheet 1

INVENTOR.
Norman D. Lawless
BY E. W. Christee
ATTORNEY $$W_E = \frac{Wr_2\,MAX + Wr_2\,MIN}{2}$$

INVENTOR.
Norman D. Lawless
BY E. W. Christen
ATTORNEY

April 9, 1963 N. D. LAWLESS 3,084,556
BALANCING APPARATUS
Filed Dec. 6, 1957 5 Sheets-Sheet 3
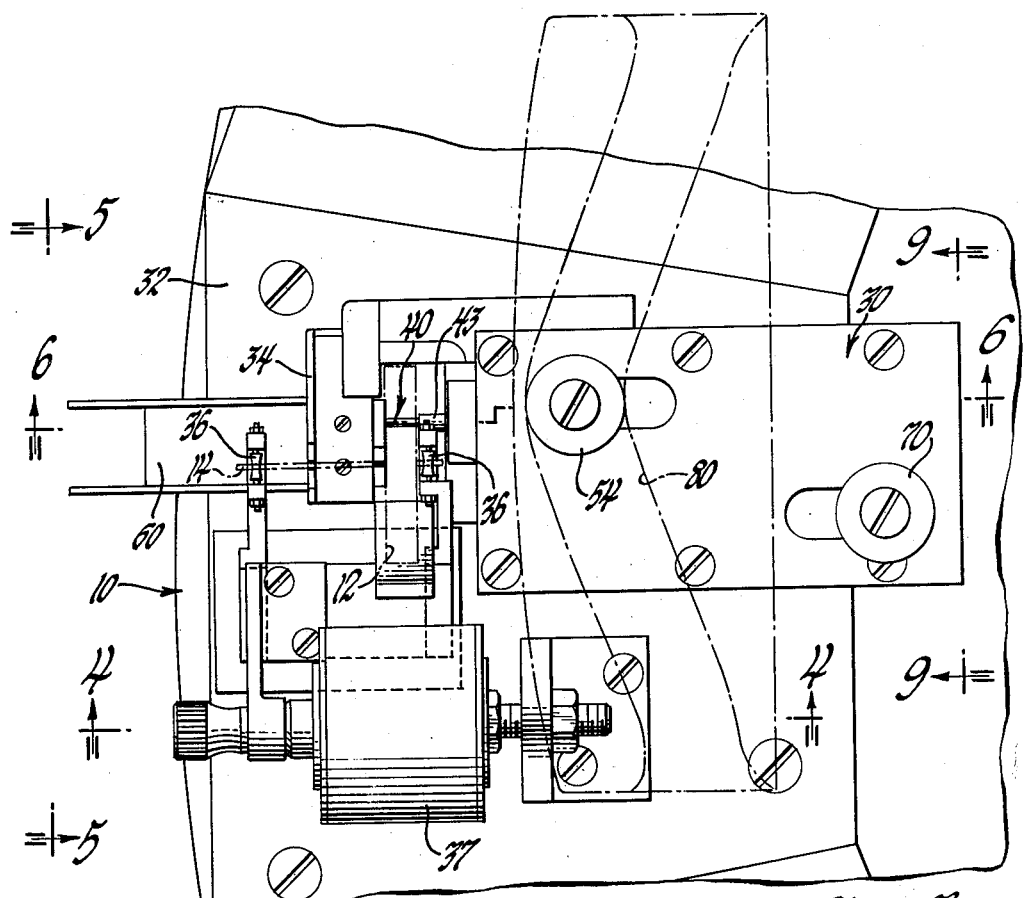
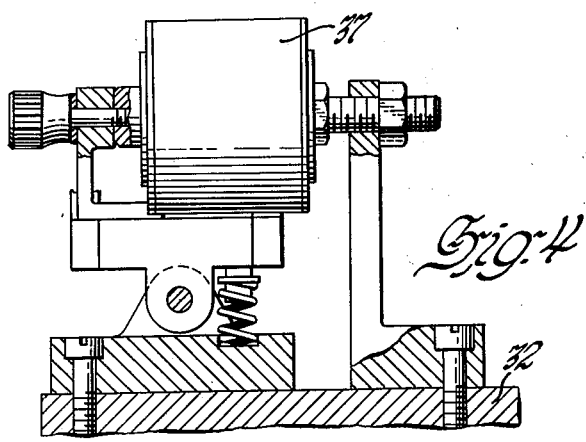
INVENTOR.
Norman D. Lawless
BY
E. W. Christen
ATTORNEY April 9, 1963    N. D. LAWLESS    3,084,556
BALANCING APPARATUS
Filed Dec. 6, 1957    5 Sheets-Sheet 4

INVENTOR.
Norman D. Lawless
BY
E. W. Christen
ATTORNEY

April 9, 1963 N. D. LAWLESS 3,084,556
BALANCING APPARATUS
Filed Dec. 6, 1957 5 Sheets-Sheet 5
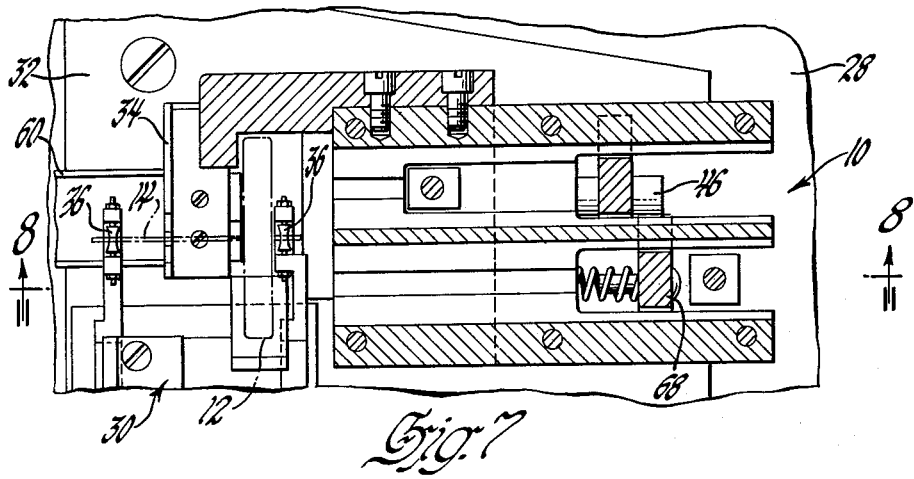
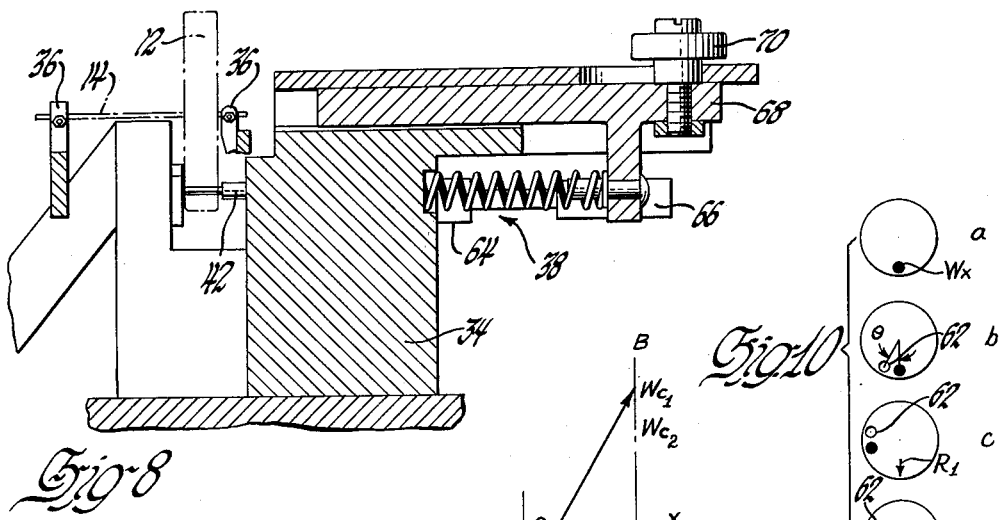
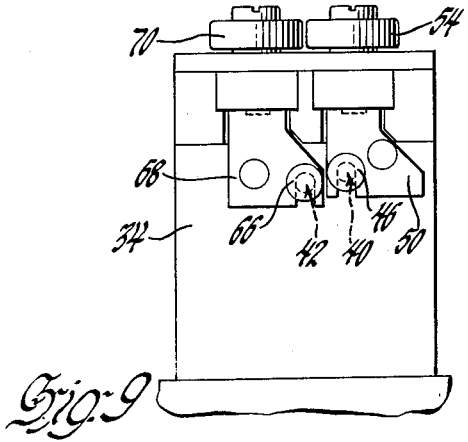
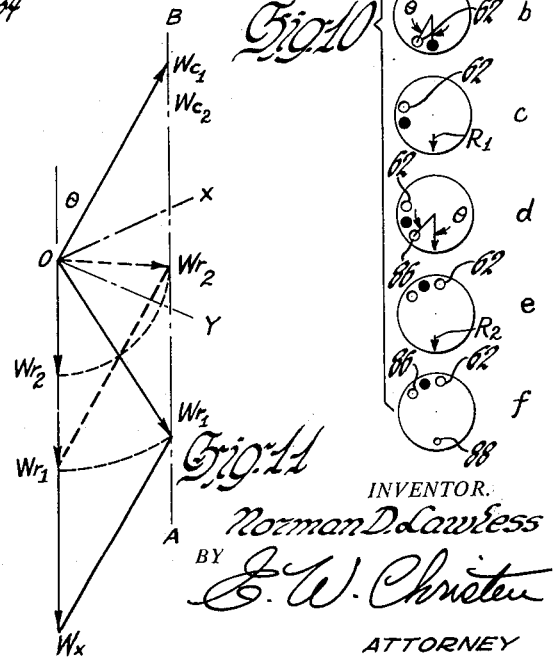
INVENTOR.
Norman D. Lawless
BY E. W. Christen
ATTORNEY United States Patent Office 3,084,556
Patented Apr. 9, 1963

3,084,556
BALANCING APPARATUS
Norman D. Lawless, Flint, Mich., assignor to General Motors Corporation, Detroit, Mich., a corporation of Delaware
Filed Dec. 6, 1957, Ser. No. 701,256
3 Claims. (Cl. 73—480)

The present invention relates to a method and apparatus for balancing a series of similar rotatable members and more particularly to means for balancing such members without the necessity of actually measuring the amount and/or location of the original unbalance therein.

When producing a series of similar members that are adapted for rotating, it is frequently necessary to balance each of the members. In the past it has been the practice to individually measure the angles and amounts of the original unbalance in said members by a rotational or weighing process. The required corrections are then computed and applied to the individual members. These operations may be performed either manually and/or automatically. However, they require several separate steps, each of which is time consuming and thereby limits the rate at which the members can be balanced. In addition, after the measuring operation, it is necessary to store and/or transmit the unbalance data so that it can be utilized during the correction operation. If this is done automatically, it requires expensive and frequently troublesome apparatus. If it is not done by such apparatus, it is subject to human error.

It is now proposed to provide a method of balancing a series of similar members which does not require the individual members to be measured to determine the amount and/or angle of unbalance therein. This is to be accomplished by mounting each of the unbalanced members in a fixture which will permit the members to rotate freely about their axes and come to rest with the point of unbalance or the heaviest portion at the bottom. A correction operation is then performed on the member at a predetermined position spaced from the diameter containing the point of unbalance. This will alter the unbalance of the member by some known amount to produce a resultant unbalance. The member is then allowed to rotate freely until this resultant unbalance comes to rest adjacent the bottom of the member. A second correction operation which may be identical to the first correction operation is then performed on the member to thereby increase or decrease the amount of unbalance to a known range of unbalance, the mean value of which may be called the equalized unbalance. The member is then allowed to freely rotate and come to rest in a new position with the equalized unbalance adjacent the bottom thereof. Since the equalized unbalance is a known amount, a third correction operation corresponding thereto is then performed on a vertical diameter of said member to thereby balance the member to within a tolerable limit.

In the drawings:

FIGURE 3 is a fragmentary plan view, on an enlarged scale, of a portion of the rotating table showing one of the balancing fixtures.

FIGURE 4 is a fragmentary cross-sectional view of the balancing fixture taken along the plane of line 4—4 of FIGURE 3.

FIGURE 7 is a fragmentary, horizontal, cross-sectional view taken substantially along the plane of line 7—7 in FIGURE 6.

FIGURE 8 is a fragmentary, vertical, cross-sectional view taken substantially along the plane of line 8—8 of FIGURE 7.

FIGURE 9 is an end view of a portion of the balancing fixture taken substantially along the plane of line 9—9 of FIGURE 3.

FIGURE 10 is a diagrammatic representation of the steps employed in balancing the workpiece.

FIGURE 11 is a vector diagram of the balancing operation.

The present invention is embodied in a machine 10 particularly adapted for continuously balancing a series of substantially identical assemblies 12 such as a speedometer drag cup. These assemblies 12 include a disk or cup permanently mounted on a shaft 14.

Figure 1:
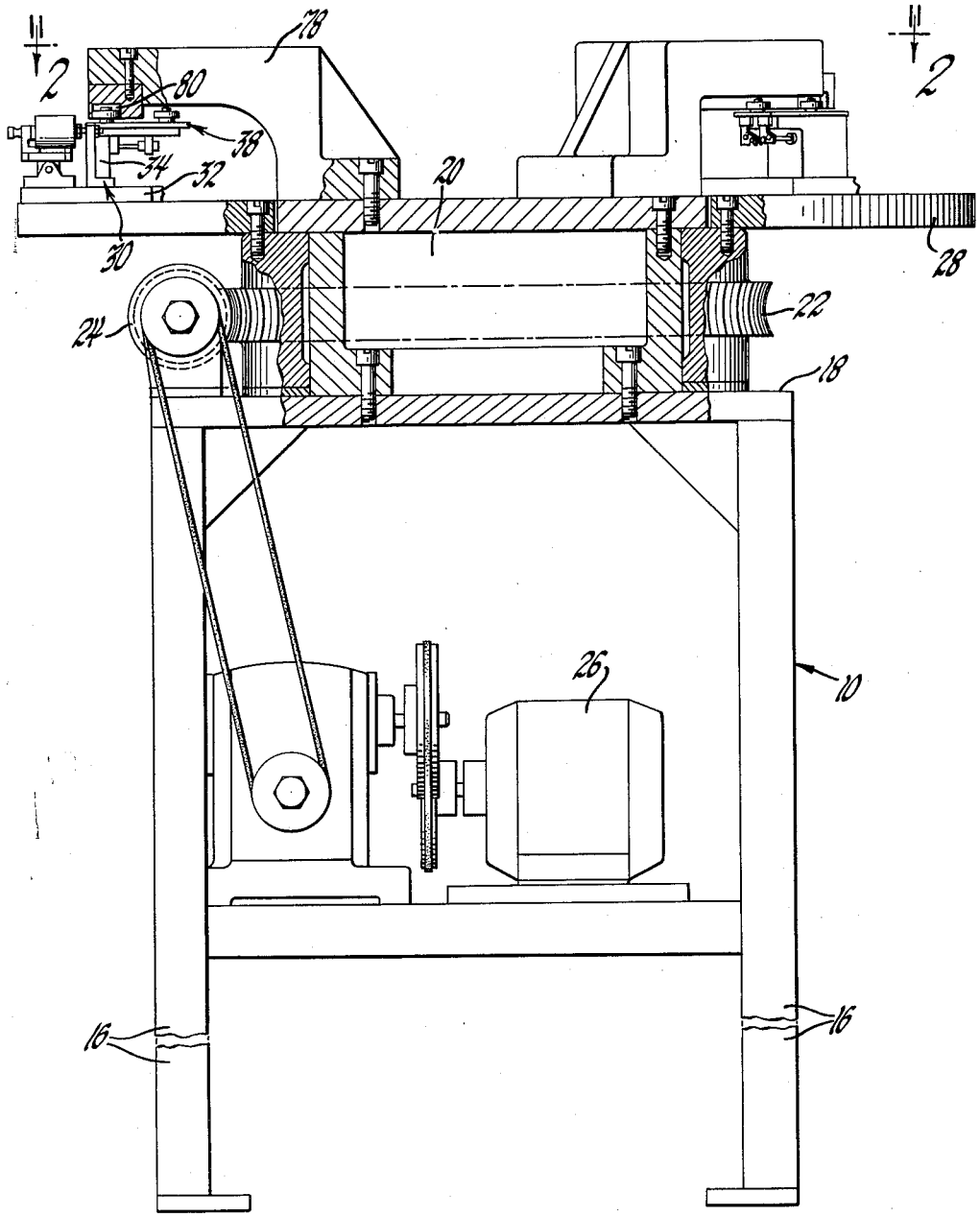
FIGURE 1 is an end view with portions thereof being broken away of a balancing apparatus embodying the present invention.

The balancing machine 10 as seen in FIGURE 1 comprises a stand or table 16 having a substantially horizontal platform 18 with a cylinder or hub 20 projecting upwardly from the center thereof. The exterior of this hub 20 forms a bearing for a worm wheel 22 meshing with and driven by a worm 24. The worm 24 is in turn belt driven by a motor 26 located in the bottom of the stand 16.

Figure 2:
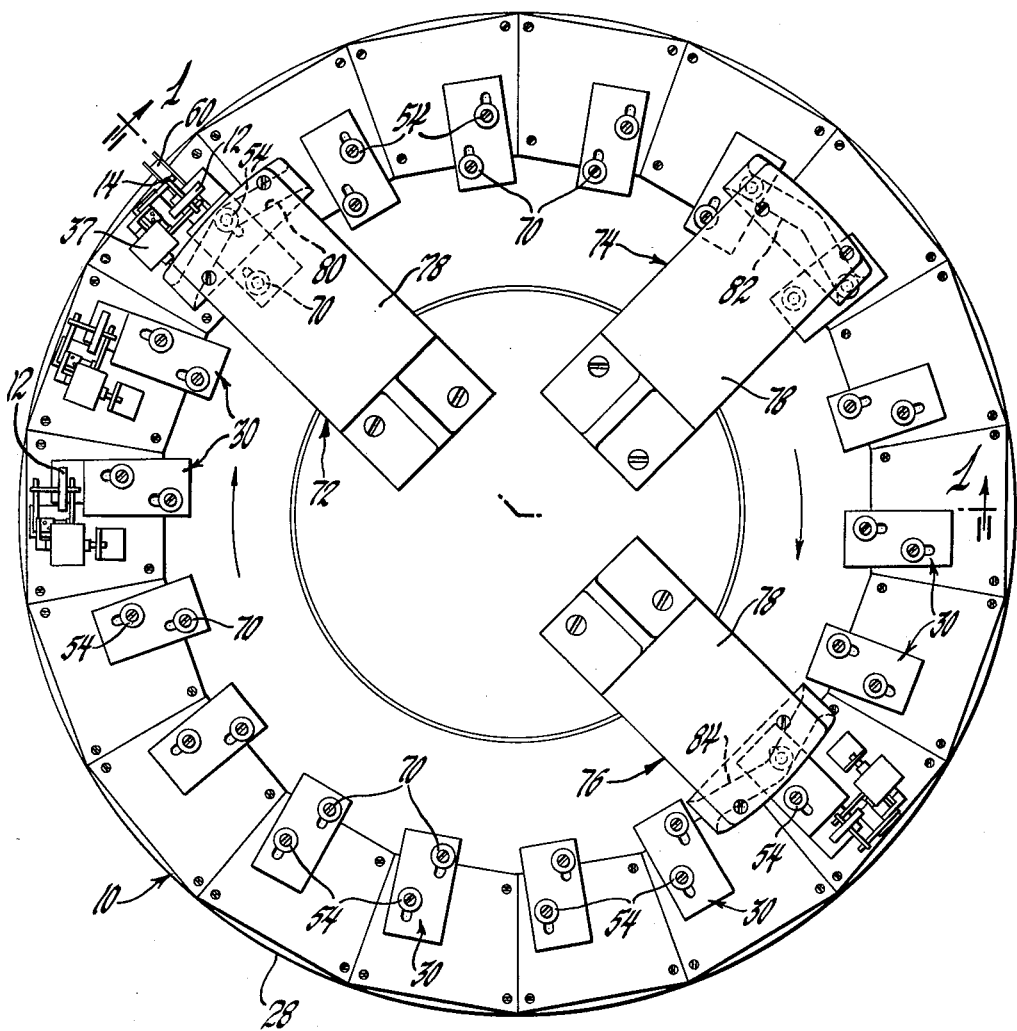
FIGURE 2 is a plan view of the balancing apparatus of FIGURE 1.

A circular turntable 28 is secured on top of the worm wheel 22 to rotate therewith and as best seen in FIGURE 2, carry a plurality of substantially identical balancing fixtures 30 shown in FIGURES 7 and 8. These balancing fixtures 30, which are circumferentially spaced around the table 28 at equal intervals, are all identical and accordingly, only one will be described. It includes a base 32 rigidly secured to the turntable 28 to move therewith. A pedestal 34 projects upwardly from the base 32 to carry a pair of bearings 36 that are aligned to receive the shaft 14 of the workpiece and correction apparatus 38 for performing balance correction operations on the workpiece.

The bearings 36 are spaced from each other so that the workpiece 12 will be disposed therebetween when the shaft 14 is on the bearings 36. When the shaft 14 is resting freely on the bearings 36, the workpiece 12 will rotate and come to rest with the heaviest portion or the point of unbalance at the bottom. Each of these bearings 36 preferably has an hourglass shape with a reduced center section so that the workpiece will always come to rest with the axis of the shaft 14 in some predetermined position. In addition, it has been found desirable to provide an electromagnet 37 or similar device for vibrating one or both of the bearings 36. This has been found effective to substantially eliminate the effects of friction and thereby increase the accuracy of the device.

The correction apparatus 38 comprises a pair of punches 40 and 42 mounted on the pedestal 34 at substantially right angles to the plane of the workpiece 12. The first punch 40 is an elongated member having a cylindrical barrel 43 reciprocably disposed in a guide 44. The head 46 of the member is enlarged to facilitate attachment to an arm 48 projecting downwardly from an overhead slide 50 mounted in a channel on top of the pedestal 34. The slide 50 includes a cam follower 54 that projects upwardly from the top thereof for reciprocably driving the punch 40. The cutting end 56 of the punch 40 is of reduced diameter for piercing the workpiece 12 and making an aperture of some predetermined size therethrough. After penetrating the workpiece 12, the cutting end 56 enters the outer guide 58 and forces the waste material to fall into a chute 60 and be discharged therefrom. The point at which this punch 40 pierces the workpiece and the size of the resultant aperture 62 will be described in connection with the operation of the machine.

The second punch 42 is very similar to the first punch except for its size and location. This punch 42 includes an elongated member disposed in a second guide 64. The head 66 of the punch 42 is secured to a second overhead slide 68 having a cam follower 70 projecting upwardly therefrom for actuating the punch 42. It should be noted that the two followers 54 and 70 are located on different radii from the center of the turntable 28 to facilitate independent actuation of the punches.

Three separate correction stations 72, 74 and 76 are spaced around the periphery of the turntable 28. Each of these stations includes an overhead arm 78 that is supported from the hub 20 in the center of the turntable 28. The underside of each arm 78 has a cam 80, 82 and 84 attached thereto for receiving one of said followers 54 and 70. The cams are V-shaped so as to drive the punches 40 and 42 outwardly for piercing the workpieces 12 as the table 28 rotates thereunder. The first two stations 72 and 74 are arranged to actuate the first punch 40 while the third station 76 is adapted to actuate the second punch 42.

During the operation of the balancing machine 10, the motor 26 drives the worm 24, which turns the worm wheel 22 and causes the turntable 28 to rotate clockwise as seen in FIGURE 2. As the balancing fixtures 30 pass through the loading zone opposite station 74, the operator places the shaft 14 of the workpiece 12 on the bearings 36 with the workpiece disposed therebetween. As the turntable 28 continues to rotate, the electromagnet 37 will vibrate the bearings 36 and cause the workpiece 12 to rotate freely about the axis of the shaft 14 until the heaviest portion or the point of original unbalance $W_x$ comes to rest at the bottom as shown in FIGURE 10a. The unbalance $W_x$ in the workpiece 12 is a result of variations in the production of the assembly and will fall within a certain range controlled by the manufacturing operations so that the unbalance will normally be no greater than some maximum limit. The amount of original unbalance is represented by the vector $W_x$ in FIGURE 11 and is represented in FIGURE 10 by the solid circle labelled $W_x$.

After the workpiece 12 has come to rest with the unbalance $W_x$ at the bottom thereof, the fixture 30 will pass under the first overhead arm 78 at the first correction station 72. The first follower 54 will then enter the recessed cam 80 and roll along the working surface thereof. This will move the slide 50 radially outwardly and cause the punch 40 to be extended and pierce the workpiece 12 and force a piece of waste material to be discharged through the chute 60. This removes a predetermined amount of material from the workpiece 12 at a predetermined angle $\theta$ from the bottom thereof as shown in FIGURE 10b. As a result of this operation the balance of the cup will be altered by $W_{c1}$ to produce a resultant unbalance that is represented by the vector $W_{r1}$ in FIGURE 11. Since the punch size and location of the aperture 62 relative to the unbalance is a constant, the resultant vector $W_{r1}$ will always terminate somewhere along the line AB.

Figure 11A:
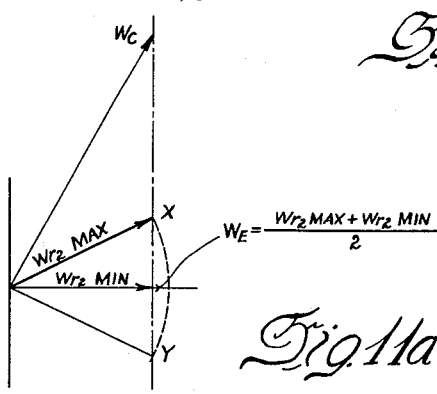
FIGURE 11a is another vector diagram of the balancing operation.
Figure 5:
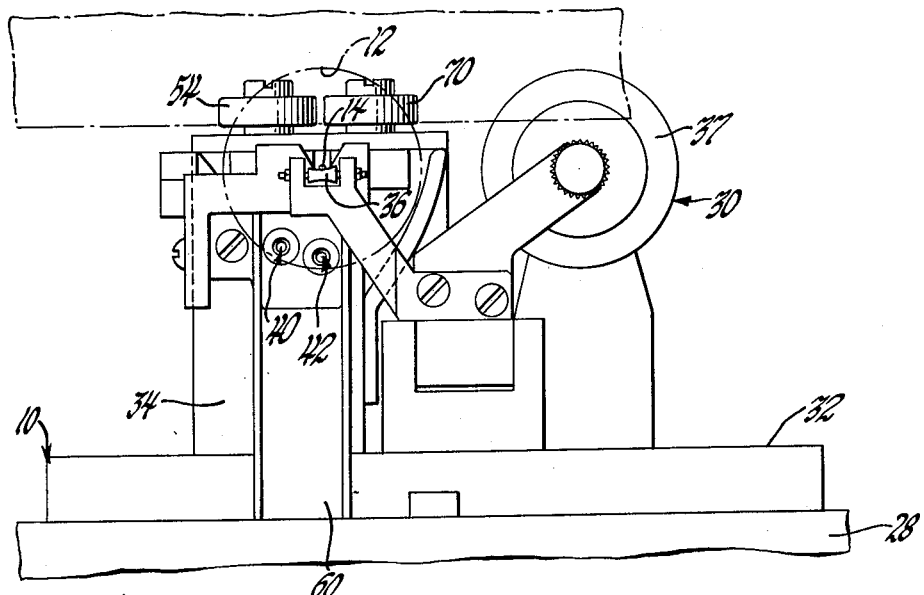
FIGURE 5 is a side view of the balancing fixture taken substantially along the plane of line 5—5 in FIGURE 3.
Figure 6:
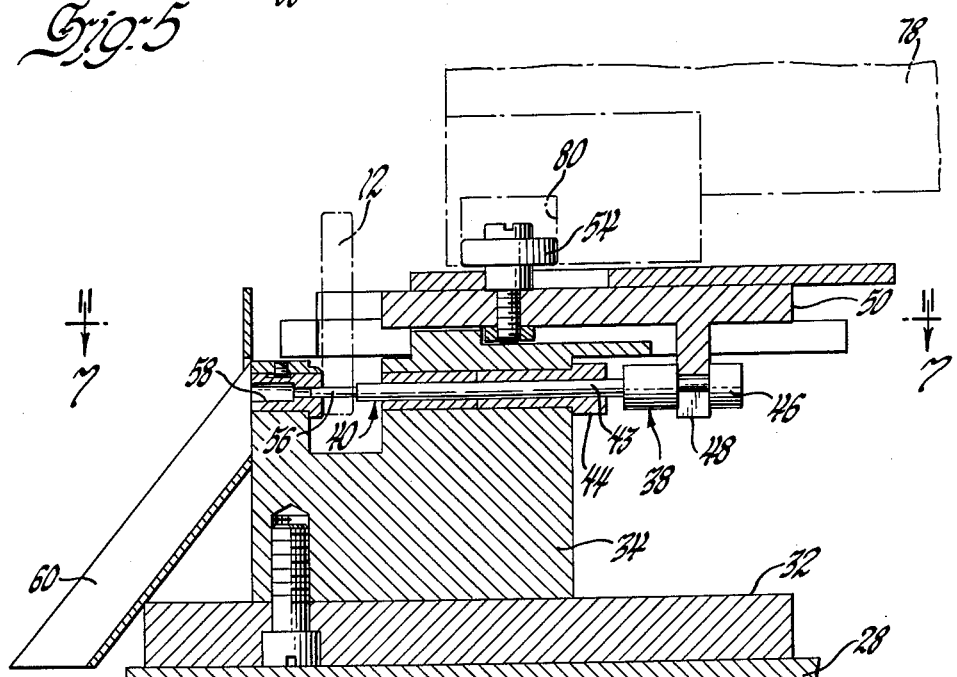
FIGURE 6 is a cross-sectional view of the balancing fixture taken substantially along the plane of line 6—6 in FIGURE 3.

After the punch 40 has been retracted the workpiece 12 will again be free to rotate and come to rest with the heaviest portion represented by the vertical vector $W_{r1}$ in FIGURE 11 thereof adjacent the bottom. This is also indicated in FIGURE 10c with the arrow $R_1$ representing the resultant unbalance after the first punching operation. The fixture 30 will then pass under the second correction station 74 and the first follower 54 will again enter the cam 82 and roll along the surface thereof so as to extend the first punch 40 and pierce the disk workpiece 12 to produce a second aperture 86 similar to the first. The vector $W_{c2}$ in FIGURE 11 represents the alteration of balance produced by punching hole 86. The resultant unbalance after the second punching is shown as the dashed vector $W_{r2}$ in FIGURE 11. As the follower 54 continues to travel along the cam 82, the punch 40 will be retracted and the workpiece 12 will be allowed to rotate so that the second resultant unbalance $W_{r2}$ may come to rest at the bottom. In FIGURE 10e, arrow $R_2$ illustrates the new unbalance at the bottom of the workpiece. Since the size and location of this punch 40 is constant relative to the first resultant unbalance $W_{r1}$, the second resultant vector $W_{r2}$ will terminate somewhere along the line AB. As previously stated the amount of the original unbalance will normally be between zero and some limited maximum amount. This will insure the second resultant unbalance being located somewhere between the limits X and Y. As a result the second resultant unbalance $W_{r2}$ will be somewhere between these limits. The average or mean of these limits is the equalized unbalance shown in FIGURE 11a as the vector $W_E$.

As the table rotates towards the third correction station, the workpiece 12 will again rotate and come to rest with the second resultant unbalance adjacent the bottom thereof. FIGURE 11 shows the unbalanced force $W_{r2}$ after the workpiece again rotates to its static position. Since the third punching is in line with the second resultant unbalance $W_{r2}$ it will directly subtract $W_E$ from $W_{r2}$. The fixture 30 will then pass through the third correction station 76 and the second follower 70 will engage the cam 84 so as to project the second punch 42 through the workpiece 12 adjacent the bottom thereof and make a third aperture 88. This punch 42 has an area adapted to remove an amount of material having a weight corresponding to the average or equalized unbalance $W_E$. Although this may not entirely balance the workpiece 12, the amount of final residual unbalance will normally be less than the difference between the equalized unbalance and $W_{r2\ max.}$ or $W_{r2\ min.}$ and will meet the required production tolerances.

The variation between the maximum and minimum unbalance is determined by the relationship between the angle and size of the first and second punches 40 and 42 relative to the amount of original unbalance in the workpiece 12. The angle and size of the first punching operations should be carefully chosen so that the position of the line AB is remote from the center and the angle between X and Y is very small. This will reduce the possible variation in the equalized unbalance.

*Summary*

The original amount of unbalance $W_x$ in the workpiece is altered by the first punching to produce a first resultant unbalance $W_{r1}$, the magnitudee of which can be determined by the law of cosine.

$$W_{r1} \sqrt{W_x^2 + W_{c1}^2 - 2W_x W_{c1} \cos \theta}$$

where $W_{c1}$ = the amount of unbalance change by the first punch.
$\theta$ = the angle between the original unbalance and the first punch.

It can be seen from the vector diagram that $W_{r1}$ will terminate somewhere on line AB. The second punching will produce a second resultant unbalance $W_{r2}$. If this punching is of the same size and location as the first punch, then $$W_{r2} \sqrt{W_{r1}^2 + W_{c1}^2 - 2W_{r1} W_{c1} \cos \theta}$$

Here again the resultant $W_{r2}$ will fall on the line AB and will be between the limits X and Y assuming the amount of original unbalance is between zero and some maximum limit. The average or mean distance from O to line AB, between the limits X and Y, has been chosen as the equalized unbalance, shown as $W_E$ in FIGURE 11a. Thus by punching the workpiece by an amount equal to the equalized unbalance, the amount of error will be very nominal and within normal production tolerances.

It is to be understood that, although the invention has been described with specific reference to a particular embodiment thereof, it is not to be so limited since changes and alterations therein may be made which are within the full intended scope of this invention as defined by the appended claims.

What is claimed is:

1. The method of individually balancing a series of substantially identical members to within a final predetermined maximum limit of unbalance, each of which originally has less than some predetermined maximum amount of unbalance, said method comprising the steps of mounting each of said members so as to be free to rotate about a substantially horizontal axis, allowing said member to rotate and come to rest with the heaviest portion adjacent the bottom thereof, removing a predetermined amount of material less than said maximum amount of unbalance from said body at a predetermined acute angular location between 15° and 45° relative to a radial line on the member extending between said heaviest portion and the axis of rotation of said member to produce a first resultant unbalance, allowing said member to again rotate and come to rest with said first resultant unbalance being located adjacent said bottom, removing the same predetermined amount of material from said body at the same predetermined angular location relative to a radial line on the member extending between said first resultant unbalance and said axis of rotation of said member to produce a second resultant unbalance falling within certain known limits, allowing said member to rotate to another position with said second resultant unbalance located adjacent said bottom, removing a smaller amount of material than that previously removed adjacent said bottom and corresponding to the average of the known limits of said second resultant unbalance.

2. The method of individually balancing a series of substantially identical members, each of which has less than some predetermined amount of unbalance, said method comprising the steps of mounting each of said members so as to be free to rotate about a substantially horizontal axis, allowing said member to rotate and come to rest with the heaviest portion adjacent the bottom thereof, removing a predetermined amount of material having a weight $W_c$ from said body at a predetermined angular location $\theta$ between 15° and 45° relative to a radial line on the member extending between said heaviest portion and the axis of rotation of said member to produce a first resultant unbalance, allowing said member to again rotate and come to rest with said first resultant unbalance being located adjacent said bottom, removing approximately said predetermined amount of material $W_c$ from said body at approximately said predetermined angular location $\theta$ relative to a radial line on the member extending between said first resultant unbalance adjacent the bottom of said member and said axis of rotation of said member to produce a second resultant unbalance falling within certain known limits, allowing said member to rotate to another position with said second resultant unbalance located adjacent said bottom, and removing an amount of material adjacent said bottom smaller than $W_c$ and corresponding to the average of the known limits of said second resultant unbalance.

3. The method of changing the unbalance in a body adapted to rotate about an axis from an original unbalance known to be within the limits $W_{x\ max.}$ and $W_{x\ min.}$ to less than a predetermined tolerable limit comprising the steps of supporting said body in a vertical position with said axis substantially horizontal, allowing said body to rotate and come to rest with the point of unbalance thereof on the bottom, altering the unbalance of said body by a predetermined amount $W_c$ greater than $W_{x\ min.}$ and less than $W_{x\ max.}$ and angularly displaced a predetermined angle $\theta$ between 15° and 45° from said bottom, allowing said body to rotate and come to rest with a first resultant point of unbalance on said bottom, again altering the unbalance of said body by the same amount at the same angular location relative to said bottom to produce a second resultant unbalance $W_{r2}$, said predetermined amount $W_c$ and said angle $\theta$ being chosen so that said second resultant unbalance $W_{r2}$ is between a predetermined minimum and maximum $W_{r2\ min.}$ and $W_{r2\ max.}$, allowing said body to again come to rest with the second resultant unbalance $W_{r2}$ on said bottom, and altering the unbalance of said body by a predetermined amount $W_E$ on a vertical axis, said last amount $W_E$ being less than $W_c$ and equal to the mean value of $W_{r2\ min.}$ and $W_{r2\ max.}$.

References Cited in the file of this patent

UNITED STATES PATENTS

| | | |
|---|---|---|
| 2,079,902 | DeWitt | May 11, 1937 |
| 2,195,252 | McKinley et al. | Mar. 26, 1940 |
| 2,288,690 | Eddison et al. | July 7, 1942 |
| 2,554,033 | Kohlhagen | May 22, 1951 |
| 2,587,048 | Kohlhagen | Feb. 26, 1952 |
| 2,737,814 | Loucks | Mar. 13, 1956 |
| 2,745,287 | Kohlhagen | May 15, 1956 |
| 2,943,492 | Huber | July 5, 1960 |